US007929905B1

(12) United States Patent
Warner et al.

(10) Patent No.: US 7,929,905 B1
(45) Date of Patent: Apr. 19, 2011

(54) METHOD AND SYSTEM FOR IMPLEMENTING A MULTI-SERVICE REPEATER

(75) Inventors: Derek Warner, Waterford, MI (US); Jason Bowker, Belleville, MI (US); Robert Woodhouse, Sparta, MI (US)

(73) Assignee: Sprint Spectrum L.P., Overland Park, KS (US)

( * ) Notice: Subject to any disclaimer, the term of this patent is extended or adjusted under 35 U.S.C. 154(b) by 962 days.

(21) Appl. No.: 11/728,509

(22) Filed: Mar. 26, 2007

(51) Int. Cl.
*H04B 3/36* (2006.01)
(52) U.S. Cl. ............................................. 455/7; 455/10
(58) Field of Classification Search .................. 455/436, 455/439, 442, 7, 13.1, 11.1
See application file for complete search history.

(56) References Cited

U.S. PATENT DOCUMENTS

| 6,370,384 | B1 | 4/2002 | Komara |
| 6,993,287 | B2 | 1/2006 | O'Neill |
| 7,123,911 | B1 * | 10/2006 | Ngan ......................... 455/435.2 |
| 7,127,175 | B2 | 10/2006 | Mani et al. |
| 2003/0220075 | A1 * | 11/2003 | Baker et al. ...................... 455/17 |
| 2006/0084379 | A1 * | 4/2006 | O'Neill ............................ 455/25 |
| 2007/0015462 | A1 * | 1/2007 | Dean et al. ....................... 455/15 |
| 2007/0249347 | A1 * | 10/2007 | Saifullah et al. ............... 455/436 |

* cited by examiner

Primary Examiner — Tu X Nguyen

(57) ABSTRACT

Disclosed herein is a method for selecting a location at which to implement a multi-service repeater in a radio access network. The multi-service repeater may provide service by repeating signals from multiple base stations including at least a first base station and a second base station. In addition, the radio access network may define a coverage area in which mobile stations operate. The method comprises, at each of one or more locations in the coverage area, evaluating one or more mobility indicators that provide information regarding movement of the mobile stations and, based, at least in part, on the evaluation of the mobility indicators at the one or more locations, selecting a given one of the locations where service could be improved by implementation of a multi-service repeater. Quality of service may be improved by intelligently selecting a location for the installation multi-service repeater based on mobility indicators.

14 Claims, 8 Drawing Sheets

METHOD AND SYSTEM FOR IMPLEMENTING A MULTI-SERVICE REPEATER

FIELD OF THE INVENTION

The present invention relates to communication services, and more particularly to quality of service in a radio access network.

BACKGROUND

In a cellular wireless communication system, such as a code division multiple access (CDMA) system for instance, base stations are positioned throughout a coverage area and emit radio frequency radiation patterns that define cells. Mobile stations operating in a given cell may then wirelessly communicate with the serving base station, and the base station may provide connectivity with further network components such as switches and gateways that connect with transport networks.

In a CDMA system, each cell is typically divided into a number of sectors, each of which is identified by a specific pseudo-noise offset (i.e., "PN offset") of a specific spreading sequence that is used to encode communications with mobile stations operating in the cell. At any given instant, a mobile station may thus operate in a given sector, and may thereby communicate with the serving base station using the PN offset of that sector. (In practice, an idle mobile station may communicate on a single PN offset (i.e., in a single sector) at once; an active mobile, on the other hand, might communicate on multiple PN offsets (i.e., in multiple sectors) at once, although a dominant one of those active PN offsets might be the focus of communications at any given moment).

In some wireless networks, the cells may not seamlessly cover an entire area, so there may be a "gap" in coverage between cells. To help solve this problem, a wireless carrier may install repeaters that function to extend the range of a given cell or sector. Service providers use various types of repeaters, including fiber-fed repeaters and wireless repeaters. Fiber-fed repeaters are connected to the base station with fiber optic cable while wireless repeaters communicate with a base station wirelessly. A repeater may be positioned between a mobile station and a base station to intercept signals sent between them. The repeater may amplify the power of these intercepted signals and send amplified versions of these signals to the mobile station or the base station. Therefore, the repeater may effectively extend the range of a given cell by boosting signals between a mobile station and a base station.

Service providers may use repeaters to create a distributed antenna system (DAS), where a number of repeaters are used to enlarge the area covered by sector. In a DAS, each BTS may be connected to a group of repeaters that operates to repeat signals between the BTS and mobile stations. This group of repeaters (and possibly the BTS as well) may radiate to define a sector in a radio access network. Unfortunately, even with the use of repeaters to create a DAS, gaps in coverage and/or areas with low signal strength still exist. An improvement is therefore desired.

SUMMARY

Wireless service may be improved by intelligently selecting a location at which to implement a multi-service repeater. A multi-service repeater functions to provide connectivity between a mobile station and multiple base stations. With multiple base station connectivity, multi-service repeaters can improve the quality of service for a mobile station. Further, quality of service at certain locations may be improved more or less than quality of service at other locations. Considering mobility indicators can help locate locations where a multi-service repeater is more beneficial.

Accordingly, a method for selecting a location at which to implement a multi-service repeater is disclosed herein. The multi-service repeater may provide service by repeating signals from multiple base stations including at least a first base station and a second base station in a radio access network. Additionally, the radio access network may define a coverage area in which mobile stations operate. The method comprises, at each of one or more locations in the coverage area, evaluating one or more mobility indicators that provide information regarding movement of the mobile stations. Based on the evaluation of the mobility indicators, the method then comprises selecting a given one of the locations where service could be improved by implementation of a multi-service repeater. Further, a multi-service repeater may then be implemented or installed at the selected one of the locations.

In the exemplary embodiment, a multi-service repeater is described as repeating signals between two base stations and a mobile station. However, configurations where multi-service repeaters are operable to repeat signals between more than two base stations and a mobile station are also possible.

The exemplary method can be carried out by a wireless service provider to select a location for a multi-service repeater. The exemplary method may be used to select a location for a multi-service repeater when creating a new wireless network, when expanding or upgrading an existing wireless network, as well as other situations.

In another aspect, a method for providing enhanced service in a radio access network is disclosed. The radio access network may comprise a coverage area in which mobile stations operate. The method comprises (a) providing a plurality of base stations comprising at least a first base station and a second base station, wherein the plurality of base stations provide service in the coverage area, (b) providing a first group of repeaters, wherein the first group of repeaters provides service in the coverage area by repeating signals from the first base station (c) providing a second group of repeaters, wherein the second group of repeaters provides service in the coverage area by repeating signals from the second base station, and wherein at least one repeater of the second group of repeaters is also a member of the first group of repeaters and provides service by repeating the signals from the first base station and by repeating the signals from the second base station, (d) using one or more mobility indicators as a basis for selecting a location in the coverage area for service enhancement, wherein the mobility indicators provide information regarding the movement of mobile stations; and (e) enhancing service in the selected location of the coverage area by installing at the selected location the at least one repeater of the second group of repeaters.

Further, the first group of repeaters (and possibly the first base station as well) may radiate to define a first sector in the coverage area of the radio access network. Likewise, a second group of repeaters (and possibly the second base station as well) may radiate to define a second sector in the coverage area of the radio access network. For example, in a CDMA network, the first group of repeaters may provide service for mobile stations using at least a particular PN offset, and the second group of repeaters may provide service for mobile stations using a different PN offset. With such an arrangement, the first sector and the second sector overlap in an area where service is provided by the repeater that repeats signals from the first and second base station.

In another aspect, the signals from the first base station may comprise signals that are simulcast from the first base station to each repeater of the first group of repeaters. Similarly, the signals from the second base station may comprise signals that are simulcast from the second base station to each repeater of the second group of repeaters. This overlapping simulcast configuration may improve quality of service.

Service may be improved in various ways by a multi-service repeater. For example, the probability of a dropped call as a mobile station moves between sectors may be reduced. Further, additional bandwidth may be provided by a multi-service repeater. Using mobility indicators may help enhance network performance by improving the intelligence and efficiency with which multi-service repeaters are located. These and other advantages of the present invention will be recognized by one skilled in the art.

These as well as other aspects, advantages, and alternatives, will become apparent to those of ordinary skill in the art by reading the following detailed description, with reference where appropriate to the accompanying drawings.

DETAILED DESCRIPTION

Figure 1:
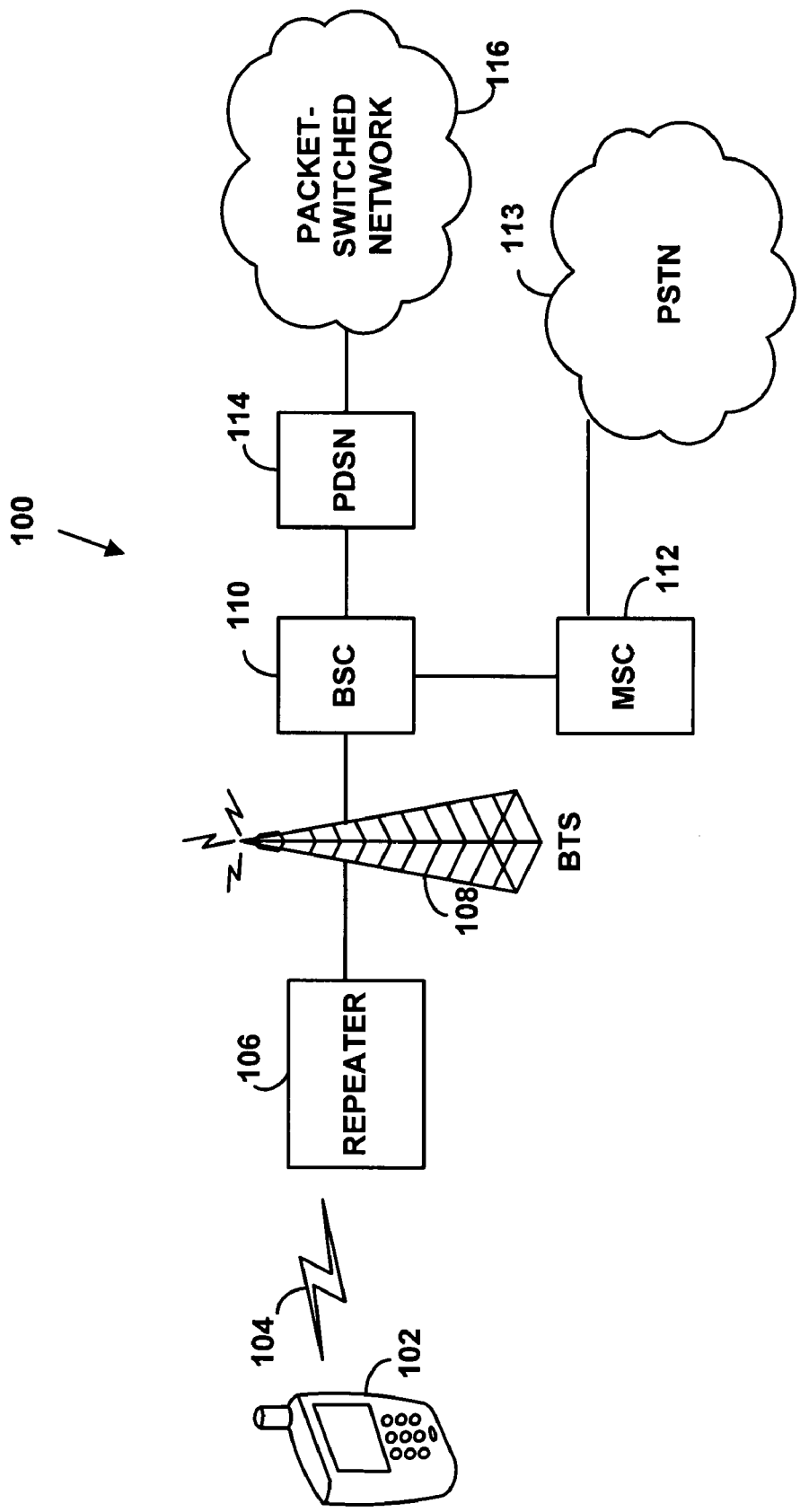
FIG. 1 is a simplified block diagram depicting a communication system in which the exemplary method can be employed.

FIG. 1 depicts an example radio access network (RAN) 100 that is operable to provide service to a mobile station 102. The mobile station 102 may take the form of a cellular telephone, wireless PDA, or wireless personal computer, for example. Further, while only one mobile station is shown in FIG. 1, RAN 100 could serve multiple mobile stations. Mobile station 102 may communicate over an air interface 104 with a repeater 106, which receives, transmits, and possibly amplifies, communications between mobile station 102 and a base transceiver station (BTS) 108, which may also be referred to as a "base station." It should be understood that multiple mobile stations can communicate with BTS 108 via repeater 106. Further mobile stations may communicate with BTS 108 directly using RF signals sent and received over an air interface.

BTS 108 may be coupled to or integrated with a base station controller (BSC) 110. BSC 110 may route communications to and from BTS 108. In particular, the BSC may route communications between BTS 108 and a mobile switching center (MSC) 112, which in turn may connect to a public switched telephone network (PSTN) 113 for voice communications. Additionally or alternatively, BSC may route communications to a packet-data serving node (PDSN) 114, which may act as a gateway for packet-data communications over a packet-switched network 116.

In some configurations, a single component of a RAN may include multiple BTSs or provide the functional equivalent of multiple BTSs. In such a configuration, signals from multiple BTSs may disseminate from the same component in a RAN. The remote antennas or groups of antennas may then radiate the signals from the RAN to define sectors in the radio access network.

At times throughout the disclosure, the invention may be described, by way of example, with reference to a CDMA network. However, this should not be construed to limit the scope of the invention to a CDMA network.

In a CDMA network, BTSs may operate with multiple carrier frequencies. On a given frequency in a CDMA system, multiple communication channels exist, each distinguished by a "Walsh code." Walsh code is a term used for a digital modulation code that distinguishes individual signals on the RF carrier frequency being transmitted. There are 64 possible Walsh codes and each code is 64 bits long for IS-95A and IS-95B (TIA/EIA-95 "Mobile Station-Base Station Compatibility Standard for Dual-Mode Spread Spectrum Systems"), and there are 64 or 128 Walsh codes with each code being 64 or 128 bits long for IS-2000 (TIA/EIA-2000 "CDMA2000 Standards for Spread Spectrum Systems").

In CDMA, each sector is distinguished by a specific pseudo-noise offset (i.e., "PN offset") of a PN-sequence that is used to encode communications with mobile stations operating in the cell. Two versions of PN sequences are typically used and are defined in the CDMA digital cellular system common air interface standard known as Interim Standard 95 ("Mobile Station-Base Station Compatibility Standard for Dual-Mode Wideband Spread Spectrum Cellular System," TIA/EIA Interim Standard (IS-95)). Individual base stations can utilize the same PN-sequence with a different "starting point" or time delay (usually 64 bits long) to encode forward link signals for each respective sector of a cell site in network 100. Therefore, each sector may encode signals using the PN-sequence offset by a respective time, e.g., a PN-offset.

Figure 2:
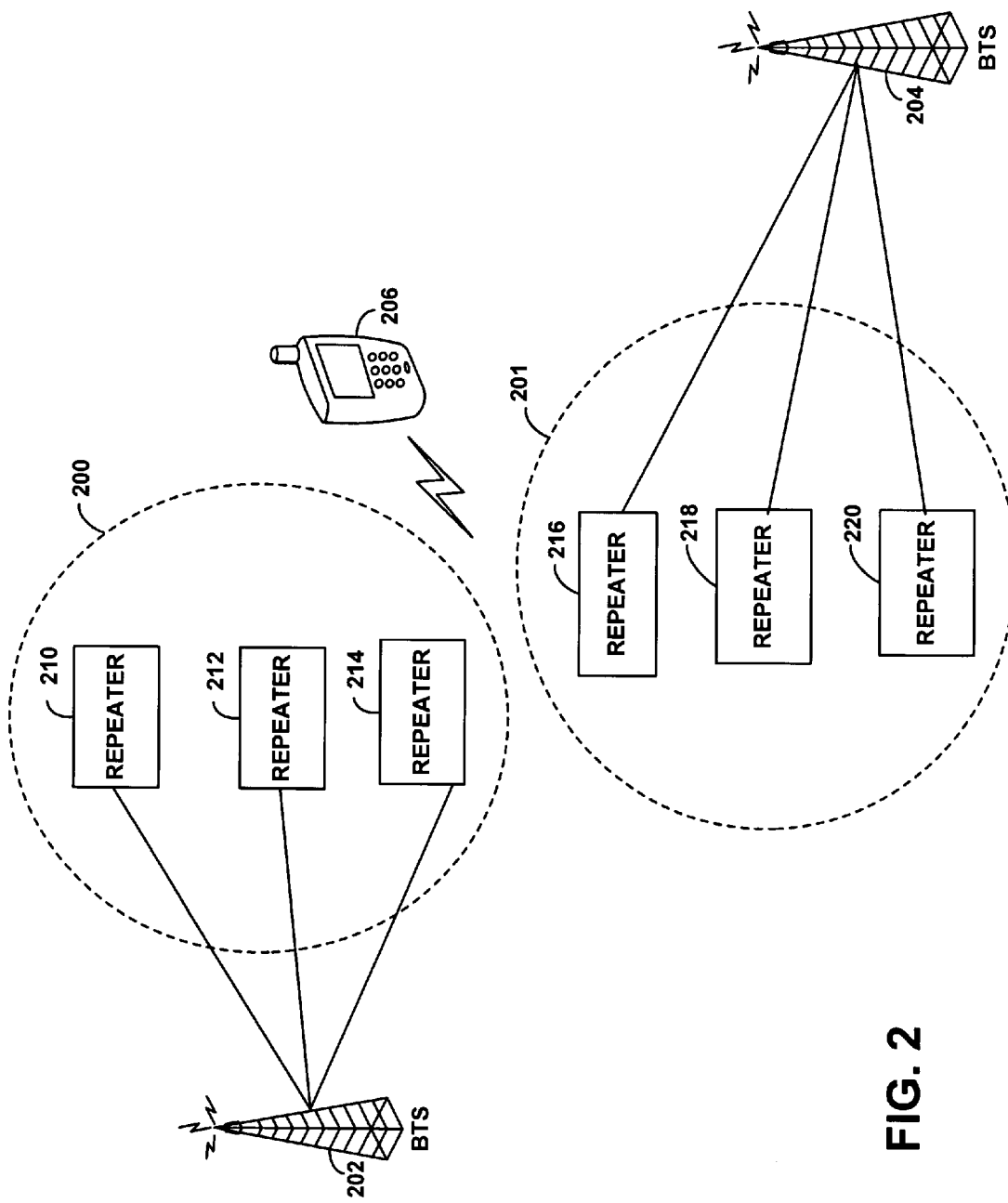
FIG. 2 is another simplified block diagram depicting a communication system in which the exemplary method can be employed.

FIG. 2 depicts two sectors 200, 201 of a radio access network. BTS 202 and BTS 204 emit signals that define sector 200 and sector 201, respectively. BTSs 202, 204 may be implemented in a RAN similar to the RAN shown in FIG. 1 that provides service for mobile station 206. The sectors are defined by repeaters 210-220. In particular, a first group of repeaters 210-214 operates to repeat signals between BTS 202 and mobile station 206, and a second group of repeaters 216-220 operates to repeat signals between BTS 204 and mobile station 206.

Repeaters 210-220 function to receive, amplify, and transmit communications passing between mobile stations and BTSs. In particular, each repeater 210-220 includes a build-out circuit that functions to amplify and/or perform other signal processing functions on communications passing between a BTS and a mobile station via the repeater. By amplifying and retransmitting communications, repeaters expand the coverage of a radio access network. For example, repeaters 210-214 expand the area where BTS 202 provides service. This expanded service area is represented by sector 200. Likewise, repeaters 216-220 radiate to define sector 201, expanding the reach of BTS 204.

A group of repeaters that repeats the signals from a single BTS, such as repeaters 210-214 or repeaters 216-220, may be referred to as a distributed antenna system (DAS) or more specifically, a repeater distributed antenna system (RDAS). In a CDMA network employing DASs, each DAS may define a sector. For example, a first DAS may include repeaters 210-214 that repeat signals from BTS 202, and a second DAS may include repeaters 216-220 that repeat signals from BTS 204. In a radio access network employing an RDAS, a BTS may transmit signals to each of the repeaters in the RDAS at approximately the same time (ideally this occurs simultaneously, but realistically, nearly simultaneous transmission is sufficient). This functionality may be referred to as "simulcasting."

As a specific example, a configuration such as FIG. 2 may be implemented in a CDMA network. In a CDMA network, repeaters 210-214 radiate to define sector 200 where service is available under a PN-offset used by BTS 202. Similarly, repeaters 216-220 radiate to define sector 201 where service is available under a PN offset associated with BTS 204. Further, as PN-offsets may be reused from BTS to BTS, BTS 202 and BTS 204 may be designed so that sector 200 and sector 201 (i.e. sectors where handoffs may occur) have different PN-offsets.

When mobile station 206 moves between sector 200 and sector 201, a handoff may occur. Generally, a "handoff" is the transferring of an ongoing communication from a first sector to a second sector in a radio access network. When the handoff occurs in a CDMA network, the mobile station ceases use of the PN offset associated with the first sector, and continues the communication using the PN offset associated with the second sector. This and other techniques for performing a handoff between sectors are also well known to those skilled in the art.

To facilitate handoffs in a CDMA network, a mobile station can maintain an "active set," which is a list of base station sectors with which the mobile station is in communication. The mobile station actually communicates with multiple base station sectors at a time (possibly via one or more repeaters), to facilitate a handoff process as the mobile station moves among sectors. The mobile station receives pilot signals from multiple base station sectors including those in its active set and those physically neighboring the active set sectors (indicated by a "neighbor list"). When the BTS is connected to a repeater, the pilot signal may be amplified and forwarded to a mobile station by the repeater. When the mobile station detects a neighbor sector having a high enough signal strength compared with the lowest signal strength of its active set sectors, the mobile station sends a pilot strength management message (PSMM) to its primary serving base station/base station controller, and receives in response a handoff direction message (HDM) directing the mobile station to move the neighbor sector into its active set in place of one of the active set sectors. This handoff process continues as the mobile station operates and moves among sectors.

It should be understood that, while FIG. 2 depicts adjacent sectors in a CDMA network that repeat signals between different base stations and a mobile station, sectors from the same BTS are also possible. More specifically a first group of repeaters, which repeats signals between a BTS and mobile stations, may radiate to define a first sector. Additionally, a second group of repeaters may repeat signals between the same BTS and mobile stations. The second group of repeaters creates a second sector by radiating signals from the BTS that have a different PN-offset. In this configuration, handoffs may be performed as described above.

Figure 3:
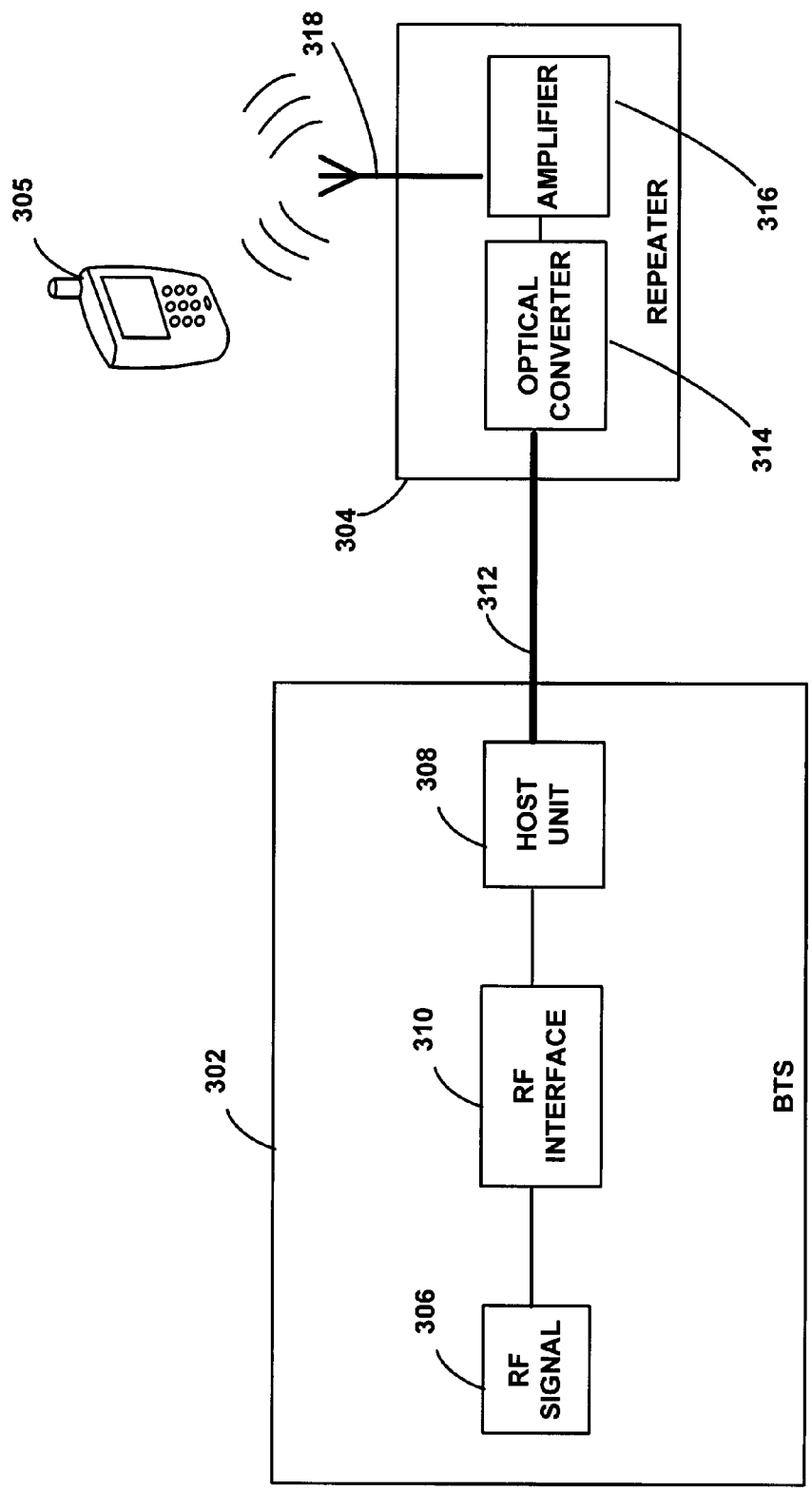
FIG. 3 is a simplified block diagram depicting an example repeater distributed antenna system.

FIG. 3 is a block diagram depicting a single BTS 302 and a single repeater 304 in greater detail. In particular, BTS 302 may provide service to mobile station 305 via repeater 304. BTS 302 generates RF signals 306, and includes a host unit 208 and an RF interface 310. BTS 302 communicates with repeater 204, which is a fiber-fed repeater, over a fiber optic cable 312. Repeater 304 includes an optical converter 314, an amplifier 316, and a coverage antenna 318. Those signals that pass from BTS 302 to mobile station 305 may be referred to as forward-link communications. Those signals that pass from the mobile station 305 to BTS 302 may be referred to as reverse-link communications.

In regards to forward-link communications, BTS 302 may transmit RF signals 306 to host unit 308 via an RF interface 310. Host unit 308 converts the RF signals to an optical signal, which can be transmitted to repeater 304 over optical cable 312. Repeater 304 includes optical converter 314 that converts the optical signals back into RF signals. The RF signals may then be amplified by amplifier 316. The amplified signals may then be transmitted by coverage antenna 318 and received by mobile station 305.

Similar functionality may also be provided to facilitate reverse-link communications from mobile station 305 to BTS 302. In particular, RF signals received by coverage antenna 318 from mobile station 305 may be amplified and converted to optical signals by optical converter 314. The converted signals can then be sent over fiber optic cable 312 to host unit 308. Host unit 308 can then convert the optical signals back into RF signals. Alternatively, RF Interface 310 may provide optical-to-RF conversion (and possibly RF-to-optical conversion as well).

It should also be understood that while FIG. 3 depicts a repeater and a BTS communicating via a fiber-optic cable, a repeater may communicate with a BTS wirelessly, without departing from the scope of the invention. More specifically, fiber-fed repeaters generally communicate with a BTS via a fiber-optic cable and with a mobile station via coverage antenna. On the other hand, wireless repeaters typically use a donor antenna to communicate with a BTS. Thus, if a wireless repeater is used, the optical converter 214 may be unnecessary. Instead, a wireless repeater may include a donor antenna (in addition to coverage antenna 218) that communicatively couples the wireless repeater to a BTS.

Figure 4:
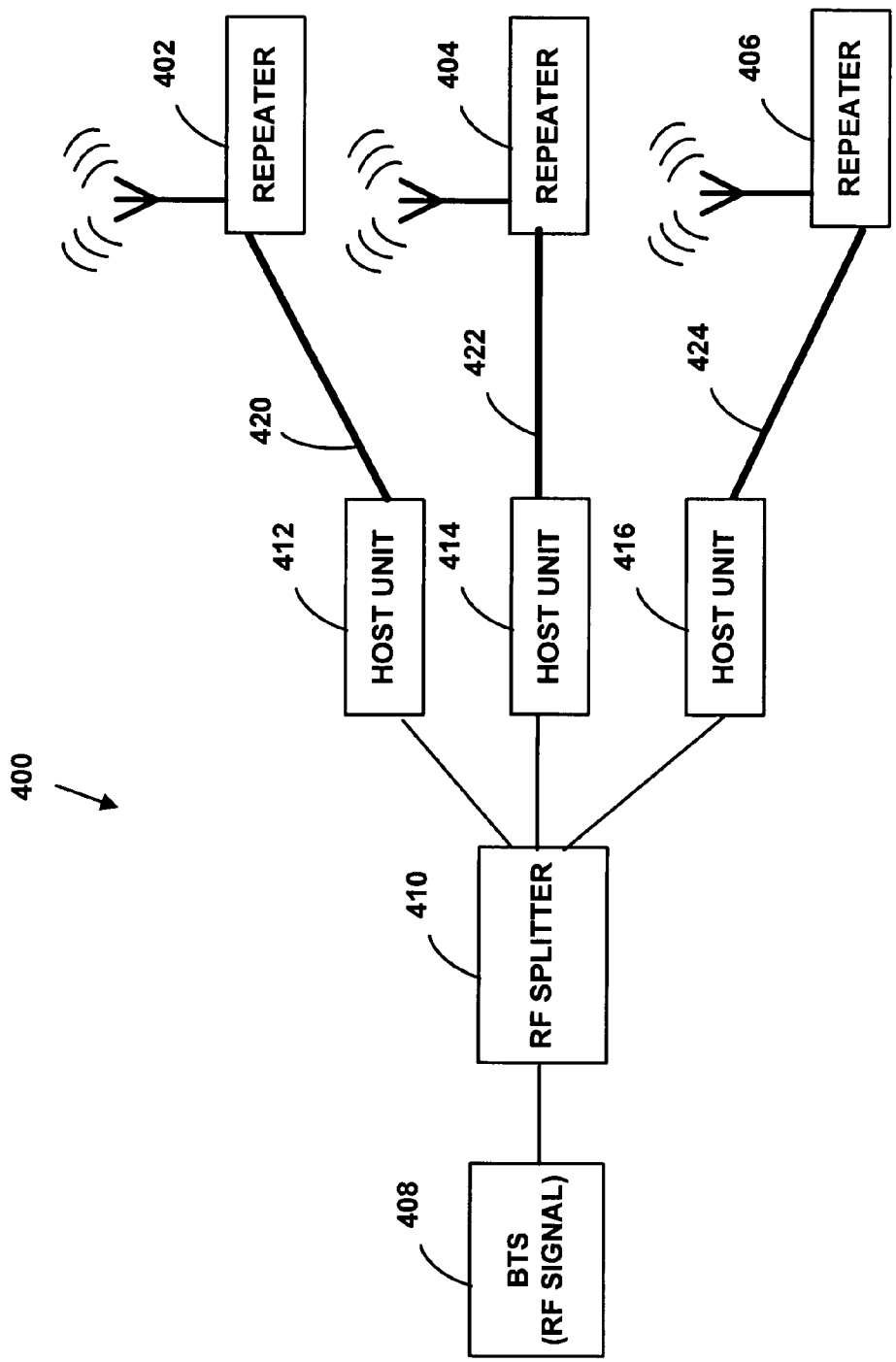
FIG. 4 is a simplified block diagram depicting an example BTS and an example repeater that can be used when employing the exemplary method.

FIG. 4 is a block diagram depicting a repeater distributed antenna system 400 in greater detail. RDAS includes repeaters 402-406, which repeat signals between BTS 408 and mobile stations. An RF signal splitter 410 splits RF signals from BTS 408, so that the BTS can communicate with each repeater 402-406, potentially via a simulcast. RDAS 400 also includes host units 412-416, which function to convert RF signals received from BTS 408 (via RF splitter 410) to optical signals. The optical signals can then be transmitted from host units 412-416 to repeaters 402-406 over fiber optic cables 420-424, respectively. With this configuration, the area covered by a BTS may increase significantly.

The RF splitter 410 may also function as a combiner or signal selector. Therefore, RF splitter 410 may select a signal passing from one of repeaters 402-406, or may combine them, and pass all of them to BTS 408. Further, RF splitter 410 may include functionality helping to implement channel planning, avoiding overlap of signals from multiple antennas. Techniques for channel planning are well known in the art.

Figure 5:
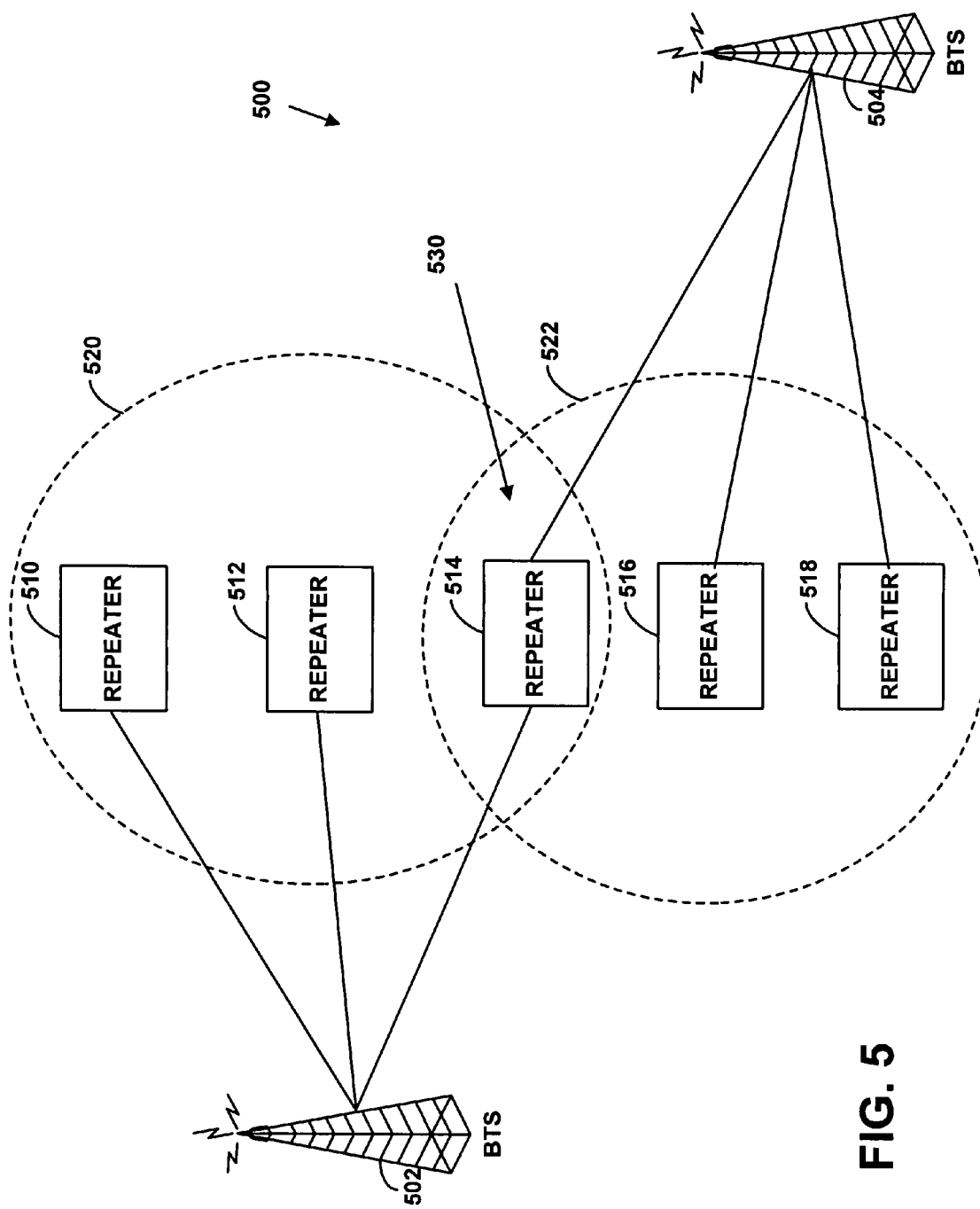
FIG. 5 is a simplified block diagram depicting a communication system with overlapping sectors in which the exemplary method can be employed.

FIG. 5 depicts an example wireless communication system 500 that is similar to FIG. 2, but includes a multi-service repeater. Wireless communication system 500 includes BTSs 502, 504 and repeaters 510-518. Repeaters 510-514 are operable to amplify and repeat communications passing between a mobile station and BTS 502. Similarly, repeaters 514-518 are operable to amplify and repeat communications passing between a mobile station and BTS 504. In addition, sector 520 is defined by BTS 502 and repeaters 510-514, and sector 522 is defined by BTS 504 and repeaters 514-518. Repeater 514 operates to amplify and repeat communications between a mobile station and both BTS 502 and BTS 504, creating a zone or area where sector 520 and sector 522 overlap. Repeaters that are operable to communicate with multiple base stations, such as repeater 514, may be referred to as "multi-service" repeaters.

A multi-service repeater, such as repeater 514, may have various designs. For example, the exemplary embodiment may employ a fiber-fed multi-service repeater, which repeats signals between multiple BTSs and a mobile station via multiple fiber-optic connections (e.g. fiber-optic cables). Alternatively, a multi-service repeater may be implemented that communicates with multiple BTSs wirelessly, via multiple donor antennas.

The wireless communication system depicted in FIG. 5 may employ an overlapping simulcast technique. To accomplish an overlapping simulcast, adjacent RDASs share a common multi-service repeater, which links the adjacent RDASs. More specifically, a first RDAS may include repeaters 510-514 and a second RDAS may include repeaters 514-518. With this configuration, the two RDAS are linked by repeater 514 which repeats signals from BTS 502 and BTS 504 at location 530. Further each BTS 502, 504 simulcasts to its associated repeaters. In particular, repeaters 510-514 repeat signals from BTS 502 and radiate to define a first sector 520. Likewise, repeaters 514-516 repeat signals from BTS 504 and radiate to define a second sector 522.

Generally, service providers may use the exemplary method to select locations for multi-service repeaters. In particular, service providers may implement multi-service repeater 514 in a location where mobility indicators suggest that a multi-service repeater would improve the network performance and/or network reliability. More specifically, information regarding the movement of mobile stations at various locations may be used to select the location where multi-service repeater 514 should be installed.

The ability to communicate with both BTS 502 and BTS 504 via repeater 514 may improve the quality of service provided to the mobile station. In particular, the probability of a dropped call may be reduced, although other benefits are also possible. Since a mobile station may receive strong signals from both BTS 502 and BTS 504 at location 530, the reliability of a handoff between sector 520 and sector 522 may be increased. More specifically, repeater 514 provides service at location 530 under the PN offset for both BTS 502 and BTS 504. As a result, any gap between sector 520 and sector 522 may be reduced (and possibly eliminated). This reduces the probability that a communication will be dropped or be of poor quality when a communication is handed off between sector 520 and sector 522. Various mobility indicators, alone or in combination, may indicate that a location is a candidate for overlapping service from a multi-service repeater. Generally, mobility indicators provide information regarding the movement of mobile stations.

It should be understood that the selected "location" for a multi-service may generally refer to the area in which the multi-service repeater provides service, but may also refer to the physical location of the multi-service repeater. More specifically, the selected location may be the area where the multi-service repeater will provide service and the physical location of the multi-service repeater may be a location within this area (i.e. within the selected location).

Figure 6:
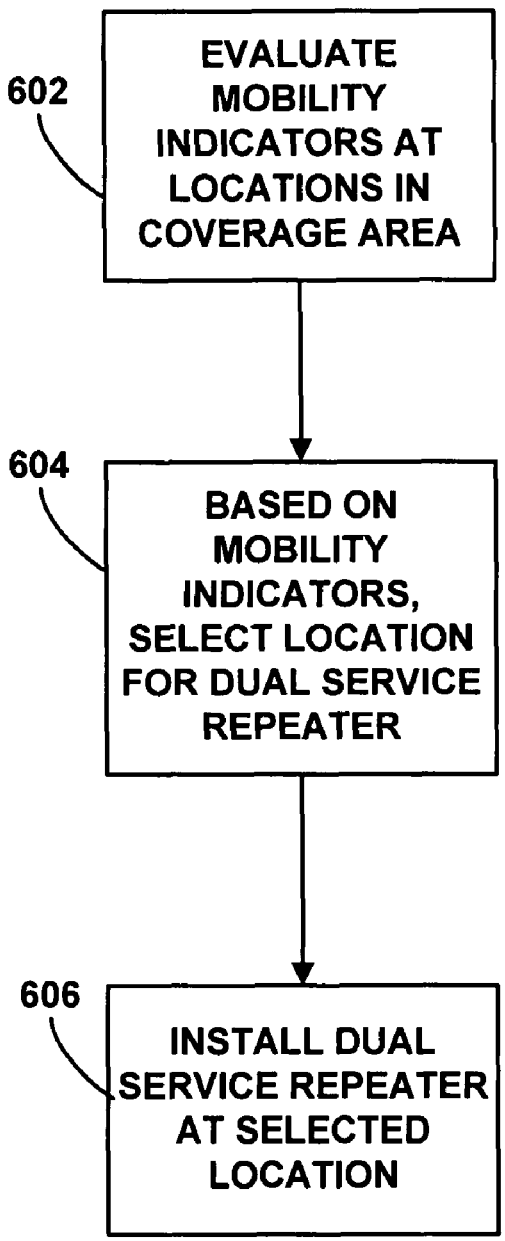
FIG. 6 is a flow chart illustrating a method for selecting a location for a multi-service repeater according to an example embodiment.

FIG. 6 is a flow chart illustrating an exemplary method for selecting a location at which to implement a multi-service repeater in a radio access network. The multi-service repeater may provide service by repeating signals from multiple base stations, which include at least a first base station and a second base station. In addition, the radio access network may define a coverage area in which mobile stations operate. The method comprises evaluating one or more mobility indicators at each of one or more locations in the coverage area, as shown by block 602. The mobility indicators may provide information regarding movement of the mobile stations. The method further comprises selecting a given one of the locations where service could be improved by implementation of a multi-service repeater, as shown by block 604. The selection is based on the evaluation of mobility indicators at the one or more locations in the coverage area. In addition, a multi-service repeater may be installed at the selected location, as shown by block 606.

Mobility indicators may include various factors that directly or indirectly provide information about the movement of mobile stations. For example, the speed with which mobile stations move at the location may be a clear indicator of mobility. On the other hand, some factors may provide information on the movement of mobile stations in a more indirect manner. For instance, network performance statistics may be indicative of mobility. As a specific example, a high rate of dropped calls or poor quality of service may be correlated with certain movement of mobile traffic. The correlation may exist because a high dropped call rate may result from failed handoffs, which occur when mobile stations move quickly between sectors. Additionally, signal fade may be an indicator of dropped calls or poor quality of service (which in turn is indicative of mobility).

A single mobility indicator or a combination of mobility indicators may be used to select a location for a multi-service repeater. As an example, a location along a highway with a 65 mile per hour speed limit may be selected because the presence of a highway indicates that mobile stations used in automobiles will be traveling at a high speed, increasing the chances that a call will be dropped. A location may be selected based on this information alone. However, the rate of dropped calls and/or the signal fade at various locations along the highway may indicate that particular locations along the highway are better candidates for a multi-service repeater than others. Thus, the selection process may be enhanced by considering the dropped call rate and/or signal fade at various locations along the highway.

Mobility indicators may be ascertained using various techniques and obtained from various sources. As a simple example, service providers may use a location determination system to track the location of a mobile station over time. As another example, historical network statistics may be compiled from various sources. In particular, service providers can maintain records indicating dropped call rates (i.e. dropped calls divided by total calls) at various locations in radio access network. Alternatively, field tests may be performed to measure network performance at various locations. For example, tests can be performed by engaging in communications while moving throughout a coverage area. Such field tests may yield mobility indicators by identifying locations where calls are frequently lost or where signals quickly fade.

In one aspect, field tests may be used to identify locations where dropped calls are more probable. Such field tests may involve placing calls from a mobile station while a mobile station to and from locations in a radio access network. Each call that is in progress as the mobile station moves to or from a particular location may be tallied as a "call" at that location. Each call that is dropped as the mobile station moves to or from the location may be tallied as a "dropped call" at the location. A dropped call rate for the location can then be determined by dividing the number of dropped calls by the total number of calls (including dropped calls).

In another aspect, field tests may involve identifying locations where signal fade occurs rapidly. It should be understand that signal fade may be related to dropped calls, as rapid signal fade may result in a dropped call. On the other hand, signal fade may not result in a dropped call, but may none-the-less degrade the quality of service. For example, signal fade may be due to channel fading, which is short multi-path fading that often occurs in urban areas, when there is a high density of cell sites and wireless service use. Urban areas also create shadow signal fading, when an area is isolated by its surrounding structures (e.g., an area behind a tall building, for instance). Signal fade may be determined as the change in signal strength in a predetermined time period. The time period may be the time for a mobile station to travel from between two locations in a radio access network. If there is significant signal fade as a mobile station moves between the points, then a location in between the points may be a candidate for a multi-service repeater. To facilitate this calculation, a mobile station may determine and report its own signal strength, or signal strength may be measured by another entity (e.g. such as a BTS, for instance).

In yet another aspect, BTSs and mobile stations may facilitate the compilation of dropped call statistics by detecting and reporting dropped calls. As an example, a BTS may contain a system for monitoring dropped calls. This system may function to detect when a communication has ended (e.g. when no RF signal is received from a mobile station). A dropped call may be detected when a communication ends and the BTS has not sent or received an end-of-call signal. Alternatively or additionally, a mobile station may include a similar system that detects when an RF signal is no longer received and determines whether or not the mobile station has sent or received an end-of-call signal.

The geographic layout or topography in the area covered by a radio access network can also influence the movement of mobile stations and therefore be used as a mobility indicator. A common example is a highway or road, where mobile stations are commonly used in moving vehicles. On a road or highway, mobile stations often move rapidly between sectors, increasing the probability of a dropped call or high rate of signal fade. Another example is an urban environment, where there is a high volume of traffic. While a volume of traffic may not itself indicate mobility, network congestion may exaggerate the effects of mobility. More specifically, network congestion may lead to calls being dropped when moving between sectors at a lower speed than at a rural location with less congestion.

A service provider can use topography as a simple mobility indicator to narrow down the number of candidate locations for a multi-service repeater. By narrowing down the possible locations based on topography, a service provider may reduce the amount of work required to select a location for a multi-service repeater. In particular, the amount of data that is analyzed, and/or the extent of field tests that are performed, may be reduced. Returning example of a highway, a service provider may select a number of potential locations along a busy highway (e.g. highway intersections or a sectors near a large city, for instance). The service provider can then perform field tests and/or analyze network data at the potential locations.

It should be understood that mobility indicators may be used to determine any mobility characteristic, including immobilization. While many of the examples herein describe the selection of a location where traffic moves rapidly, a location may also be selected based on indications of slow, or even immobile, wireless traffic. As an example, when a large number of mobile stations share network resources, quality of service may be reduced, calls may be dropped, and/or users may not be able establish a connection to the network. This situation may occur when a number of mobile stations operate in a small area, such as during rush hour traffic, and/or at the intersection of two highways where cars must slow down to move between the highways. In such scenarios, a large number of users may attempt to establish communications in a small area, straining network resources. A multi-service repeater can reduce the strain by providing service via multiple BTSs. Therefore, a location with slow or confined mobile traffic may be identified using mobility indicators and accordingly selected as a candidate for a multi-service repeater.

Figure 7:
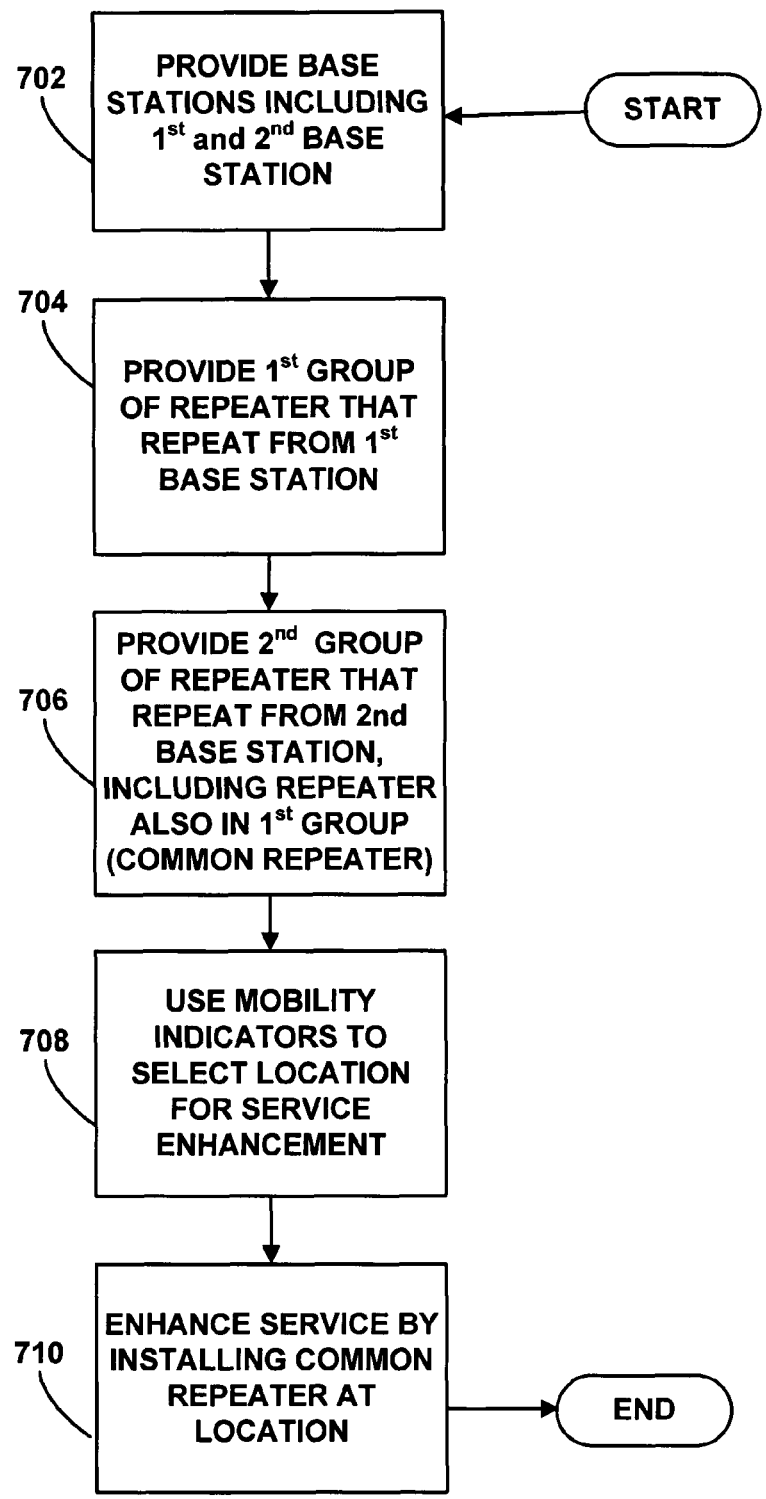
FIG. 7 is a flow chart illustrating a method for providing enhanced service in a radio access network according to an example embodiment.

FIG. 7 shows an example method for providing a radio access network with enhanced service. In particular, enhanced service is provided with at least one intelligently located multi-service repeater. The radio access network may define a coverage area in which mobile stations operate. The method involves providing a plurality of base stations or BTSs that include at least a BTS and a second BTS, as shown by block 702. The BTSs may function to provide service in the coverage area. A first group of repeaters that provide service in the coverage area by repeating signals from the first BTS may also be provided, as shown by block 704. Similarly, a second group of repeaters that provide service in the coverage area by repeating signals from the second BTS may be provided, as shown by block 706.

Block 706 also indicates that at least one repeater is a member of both the first and second groups (e.g. a common repeater). This common repeater is a multi-service repeater and operates to repeat signals between the first BTS and the second BTS. Mobility indicators may be used to select a location for enhanced service, as shown by block 708. To enhance service, the repeater that is common to both groups is installed at the selected location, as shown by block 710.

In one aspect, the wireless communication system may employ RDASs. In particular, an RDAS may include the first BTS and first group of repeaters, while another RDAS may include the second BTS and the second group of repeaters. Each RDAS may define a sector. Therefore, installing the common repeater links the two RDASs, creating overlapping sectors. It should be understood that this configuration may be implemented in scenarios involving any number of RDAS.

It should be understood that exemplary methods may be used to select a location for a multi-service repeater when installing a new RAN, when extending an existing RAN into a new coverage area, or when upgrading an existing RAN in an existing coverage area. Depending on the scenario, the mobility indicators that are available and/or relevant to the selection process may vary. One skilled in the art will recognize how various mobility indicators can be used in various scenarios.

Figure 8:
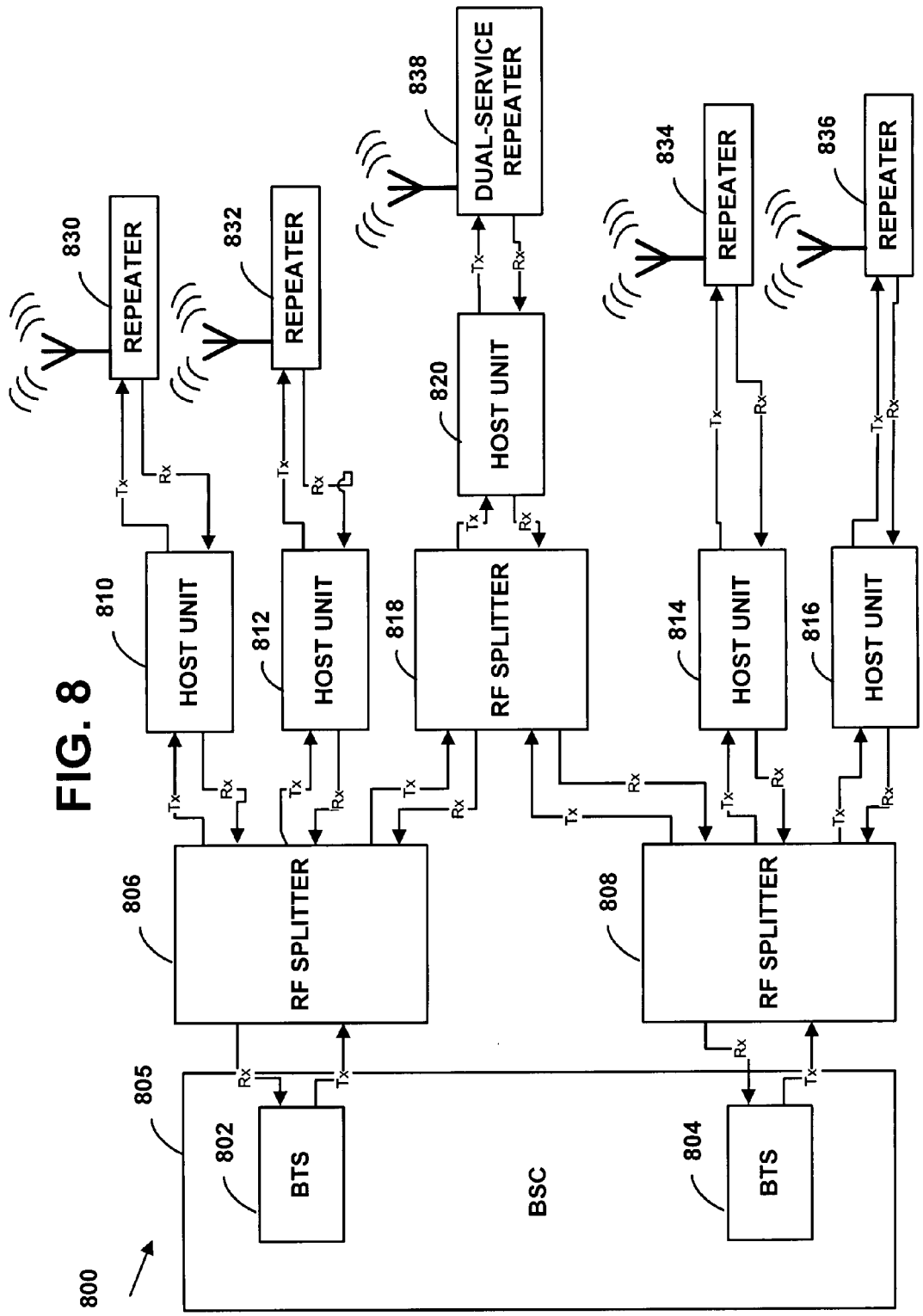
FIG. 8 is another simplified block diagram depicting an example repeater distributed antenna system.

FIG. 8 depicts an radio access network 800 that implements a multi-service repeater in an overlapping simulcast configuration. The system includes two BTSs 802, 804 that each provide RF signals. The BTSs may be co-located or housed in a single BSC 805. In FIG. 8, "Rx" signal paths represent signal paths for reverse-link communications received by BTSs 802, 804 and "Tx" signal paths represent signal paths for forward-link communications transmitted by BTSs 802, 804.

An overlapping simulcast configuration is implemented using various RF splitters. RF splitter 806 operates to split and/or combine signals passing to and from BTS 802 via host units 810, 812. Similarly, RF splitter 808 operates to split and/or combine signals passing between BTS 804 and host units 814, 816. Host units 810, 812, 814, 816 operate to provide ADC functionality to convert RF signals from their respective BTS to an optical signal that can be transmitted over a fiber-optic cable. RF splitter 818 operates to receive signals from both BTS 802 (via RF splitter 806) and BTS 84 (via RF splitter 808). RF splitter 818 allows host unit 820 to receive signals from and send signals to both BTS 802 and BTS 804.

Also provided is a plurality of repeaters. Repeaters 830, 832 operate to repeat RF signals from BTS 802 (via host units 810, 812 and RF splitter 806) and repeaters 834, 836 operate to repeat RF signals from BTS 804 (via host units 814, 816 and RF splitter 808). Repeater 838 is a multi-service repeater that may be installed at a location selected with an exemplary method. Multi-service repeater 838 is operable to repeat RF signals from both BTS 802 and BTS 804 via host unit 820, RF splitter 818, and RF splitter 806 and RF splitter 808, respectively.

In a system utilizing to an exemplary method to implement multi-service repeaters, multiple BTSs may be co-located or housed with a shared BSC. This type of configuration is shown in FIG. 8 with BTS 802 and 804 combined in a single BSC 805. With this configuration the RF splitters 806, 808, 818 and/or the host units 810, 812, 814, 816, 820 may be co-located or housed with BSC 805. In an alternative embodiment, BTSs may not be co-located or housed within a common BSC. In such an embodiment a host unit may be placed between RF splitter 806 and RF splitter 818, and between RF splitter 808 and RF splitter 818. In addition, a remote unit, co-located with the multi-service repeater may allow the multi-service repeater to repeat from multiple BTSs. This configuration allows the RF signals from multiple BTSs to be combined remotely, away from the BSC, when BTSs are not co-located.

Example embodiments of the present invention have been described above. Those skilled in the art will understand, however, that changes and modifications may be made to these embodiments without departing from the true scope and spirit of the invention, which is defined by the claims.

We claim:

1. A non-transitory computer-readable medium having instructions stored thereon, wherein the instructions are for selecting a location at which to implement a multi-service repeater in a radio access network, wherein the multi-service repeater provides service by repeating signals from multiple base stations including at least a first base station and a second base station in the radio access network, and wherein the radio access network defines a coverage area in which mobile stations operate, the instructions comprising:
   instructions for, at each of one or more locations in the coverage area, evaluating one or more mobility indicators that provide information regarding movement of the mobile stations, wherein one of the mobility indicators is speed of the mobile stations; and
   instructions for, based at least in part on the evaluation of the mobility indicators at the one or more locations, selecting a given one of the locations where service could be improved by implementation of a multi-service repeater.

2. The non-transitory computer-readable medium of claim 1, wherein another one of the mobility indicators is historical network performance statistics.

3. The non-transitory computer-readable medium of claim 2, wherein the historical network performance statistics comprise dropped call statistics.

4. The non-transitory computer-readable medium of claim 1, wherein one of the mobility indicators comprises historical level of use by mobile stations.

5. The non-transitory computer-readable medium of claim 1, wherein one of the mobility indicators comprises an indicator of signal fade.

6. A non-transitory computer-readable medium having instructions stored thereon, wherein the instructions are for selecting a location at which to implement a multi-service repeater in a radio access network, wherein the multi-service repeater provides service by repeating signals from multiple base stations including at least a first base station and a second base station in the radio access network, and wherein the radio access network defines a coverage area in which mobile stations operate, the instructions comprising:
   instructions for, at each of one or more locations in the coverage area, evaluating one or more mobility indicators that provide information regarding movement of the mobile stations, wherein one of the mobility indicators comprises a rate of signal fade as a mobile station moves at a given speed; and
   instructions for, based at least in part on the evaluation of the mobility indicators at the one or more locations, selecting a given one of the locations where service could be improved by implementation of a multi-service repeater.

7. A non-transitory computer-readable medium having instructions stored thereon, wherein the instructions are for selecting a location at which to implement a multi-service repeater in a radio access network, wherein the multi-service repeater provides service by repeating signals from multiple base stations including at least a first base station and a second base station in the radio access network, and wherein the radio access network defines a coverage area in which mobile stations operate, the instructions comprising:
   instructions for, at each of one or more locations in the coverage area, evaluating one or more mobility indicators that provide information regarding movement of the mobile stations, wherein one of the mobility indicators, wherein one of the mobility indicators comprises the geographical layout of the zone, wherein the geographical layout comprises a first highway, and wherein another one of the mobility indicators comprises the speed of mobile stations on the first highway; and
   instructions for, based at least in part on the evaluation of the mobility indicators at the one or more locations, selecting a given one of the locations where service could be improved by implementation of a multi-service repeater.

8. The non-transitory computer-readable medium of claim 7, wherein the geographical layout further comprises a second highway intersecting with the first highway.

9. The non-transitory computer-readable medium of claim 8, wherein another one of the mobility indicators comprises a measure of the speed with which mobile stations move between the first highway and the second highway.

10. The non-transitory computer-readable medium of claim 8, wherein another one of the mobility indicators comprises a measure of signal fade as mobile stations move between the first highway and the second highway.

11. A method for providing enhanced service in a radio access network, wherein the radio access network comprises a coverage area in which mobile stations operate, the method comprising:

providing a plurality of base stations comprising at least a first base station and a second base station, wherein the plurality of base stations provide service in the coverage area;

providing a first group of repeaters, wherein the first group of repeaters provides service in the coverage area by repeating signals from the first base station, wherein the first base station and the first group of repeaters provide service for mobile stations using at least a first signal frequency;

providing a second group of repeaters, wherein the second group of repeaters provides service in the coverage area by repeating signals from the second base station, and wherein at least one repeater of the second group of repeaters is also a member of the first group of repeaters and provides service by repeating the signals from the first base station and by repeating the signals from the second base station, wherein the second base station and the second group of repeater provide service for mobile stations using at least a second signal frequency;

using one or more mobility indicators as a basis for selecting a location in the coverage area for service enhancement, wherein the mobility indicators provide information regarding the movement of mobile stations; and enhancing service in the selected location of the coverage area by installing at the selected location the at least one of the second group of repeaters.

12. The method of claim 11 wherein the first base station and the first group of repeaters comprise a first sector in the coverage area, wherein the second base station and the second group of repeaters comprise a second sector in the coverage area, and wherein the first sector and the second sector overlap in an area where service is provided by the at least one of the second group of repeaters that is also a member of the first group of repeaters.

13. The method of claim 11, wherein the signals from the first base station comprise signals that are simulcast from the first base station to each of the first group of repeaters, and wherein the signals from the second base station comprise signals that are simulcast from the second base station to each of the second group of repeaters.

14. The method of claim 11, wherein the first signal frequency comprises a first PN offset, and wherein the second signal frequency comprises a second PN offset.

* * * * *